US008950357B2

(12) United States Patent
Rajkondawar et al.

(10) Patent No.: US 8,950,357 B2
(45) Date of Patent: Feb. 10, 2015

(54) SYSTEM AND METHOD FOR MILKING STALL ASSIGNMENT USING REAL-TIME LOCATION

(75) Inventors: Parimal G. Rajkondawar, Madison, WI (US); Roger K. Erdman, Janesville, WI (US); David A. Johnson, McFarland, WI (US); William S. Nelson, Sun Prairie, WI (US); Paul D. Thompson, Madison, WI (US); Gary C. Steingraber, Madison, WI (US)

(73) Assignee: Technologies Holdings Corp., Kawasaki-shi (JP)

( * ) Notice: Subject to any disclaimer, the term of this patent is extended or adjusted under 35 U.S.C. 154(b) by 457 days.

(21) Appl. No.: 13/050,096

(22) Filed: Mar. 17, 2011

(65) Prior Publication Data

US 2012/0234245 A1 Sep. 20, 2012

(51) Int. Cl.
*A01J 5/00* (2006.01)
*A01J 5/007* (2006.01)
*A01K 1/12* (2006.01)
*A01K 29/00* (2006.01)

(52) U.S. Cl.
CPC . *A01J 5/007* (2013.01); *A01K 1/12* (2013.01); *A01K 29/005* (2013.01)
USPC .................................... 119/14.02; 119/14.03

(58) Field of Classification Search
CPC . A01K 29/005; A01K 2227/101; A01K 1/12; A01K 1/123; A01K 1/126; A01J 5/007; A01J 5/0136
USPC ................................ 119/14.03, 14.02, 14.14
See application file for complete search history.

(56) References Cited

U.S. PATENT DOCUMENTS

| 6,516,744 | B1* | 2/2003 | Bjork et al. | 119/14.02 |
| 7,296,536 | B2* | 11/2007 | Umegard | 119/14.03 |
| 7,721,675 | B2* | 5/2010 | Kaever et al. | 119/14.08 |
| 2003/0154925 | A1* | 8/2003 | Van Den Berg et al. | 119/14.02 |
| 2005/0223997 | A1* | 10/2005 | Umegard | 119/14.03 |

(Continued)

FOREIGN PATENT DOCUMENTS

| EP | 0898883 | 9/1998 |
| EP | 1523881 | 9/2004 |

(Continued)

OTHER PUBLICATIONS

PCT Notification of Transmittal of the International Search Report and the Written Opinion of the International Searching Authority, or the Declaration, mailed Jul. 2, 2012 regarding PCT/US2012/026232, Jul. 2, 2012.

*Primary Examiner* — Monica Williams
*Assistant Examiner* — Joshua Huson
(74) *Attorney, Agent, or Firm* — Baker Botts L.L.P.

(57) ABSTRACT

In certain embodiments, a method for milking stall assignment includes storing first location information associated with a dairy livestock, the first location information comprising a coordinate location of the dairy livestock within a milking parlor at a first time. The method further includes comparing the stored first location information associated with the dairy livestock with an area associated with each of a plurality of milking stalls of the milking parlor to identify a milking stall in which the dairy cow is located at the first time and assigning the dairy livestock to the milking stall in which the dairy cow is located at the first time such that data associated with milking of the dairy livestock may be associated with the dairy cow.

9 Claims, 2 Drawing Sheets

(56) References Cited

U.S. PATENT DOCUMENTS

| | | | |
|---|---|---|---|
| 2006/0254523 A1* | 11/2006 | Guo | 119/14.03 |
| 2010/0107985 A1* | 5/2010 | O'Hare | 119/174 |
| 2010/0116211 A1* | 5/2010 | Sundborger | 119/14.02 |
| 2010/0147221 A1* | 6/2010 | Holscher et al. | 119/14.02 |
| 2010/0154722 A1* | 6/2010 | Van Den Berg et al. | 119/720 |
| 2010/0331739 A1* | 12/2010 | Maltz et al. | 600/588 |

FOREIGN PATENT DOCUMENTS

| | | | | |
|---|---|---|---|---|
| WO | WO 2008113556 A1 * | 9/2008 | | A01K 29/00 |
| WO | WO 2010066429 A1 * | 6/2010 | | A01K 29/00 |

* cited by examiner

SYSTEM AND METHOD FOR MILKING STALL ASSIGNMENT USING REAL-TIME LOCATION

TECHNICAL FIELD

This invention relates generally to dairy farming and more particularly to a system and method for milking stall assignment using real-time location.

BACKGROUND OF THE INVENTION

Over time, the size and complexity of dairy milking operations has increased. Accordingly, the need for efficient and scalable systems and methods that support dairy milking operations has also increased. Systems and methods supporting dairy milking operations, however, have proven inadequate in various respects.

SUMMARY OF THE INVENTION

According to embodiments of the present disclosure, disadvantages and problems associated with previous systems and methods for milking stall assignment may be reduced or eliminated.

In certain embodiments, a method for milking stall assignment includes storing first location information associated with a dairy livestock, the first location information comprising a coordinate location of the dairy livestock within a milking parlor at a first time. The method further includes comparing the stored first location information associated with the dairy livestock with an area associated with each of a plurality of milking stalls of the milking parlor to identify a milking stall in which the dairy cow is located at the first time and assigning the dairy livestock to the milking stall in which the dairy cow is located at the first time such that data associated with milking of the dairy livestock may be associated with the dairy cow.

Particular embodiments of the present disclosure may provide one or more technical advantages. For example, certain embodiments of the present disclosure may facilitate accurate assignment of dairy livestock to milking stalls of a milking parlor, thereby allowing milk produced by each of the dairy livestock to be accurately associated with the appropriate dairy livestock. As a result, characteristics of the milk produced by each of the dairy livestock (e.g., volume, quality, etc.) may be accurately monitored overtime. Such monitoring may facilitate herd management and thus may be important aspect in certain dairy operations.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
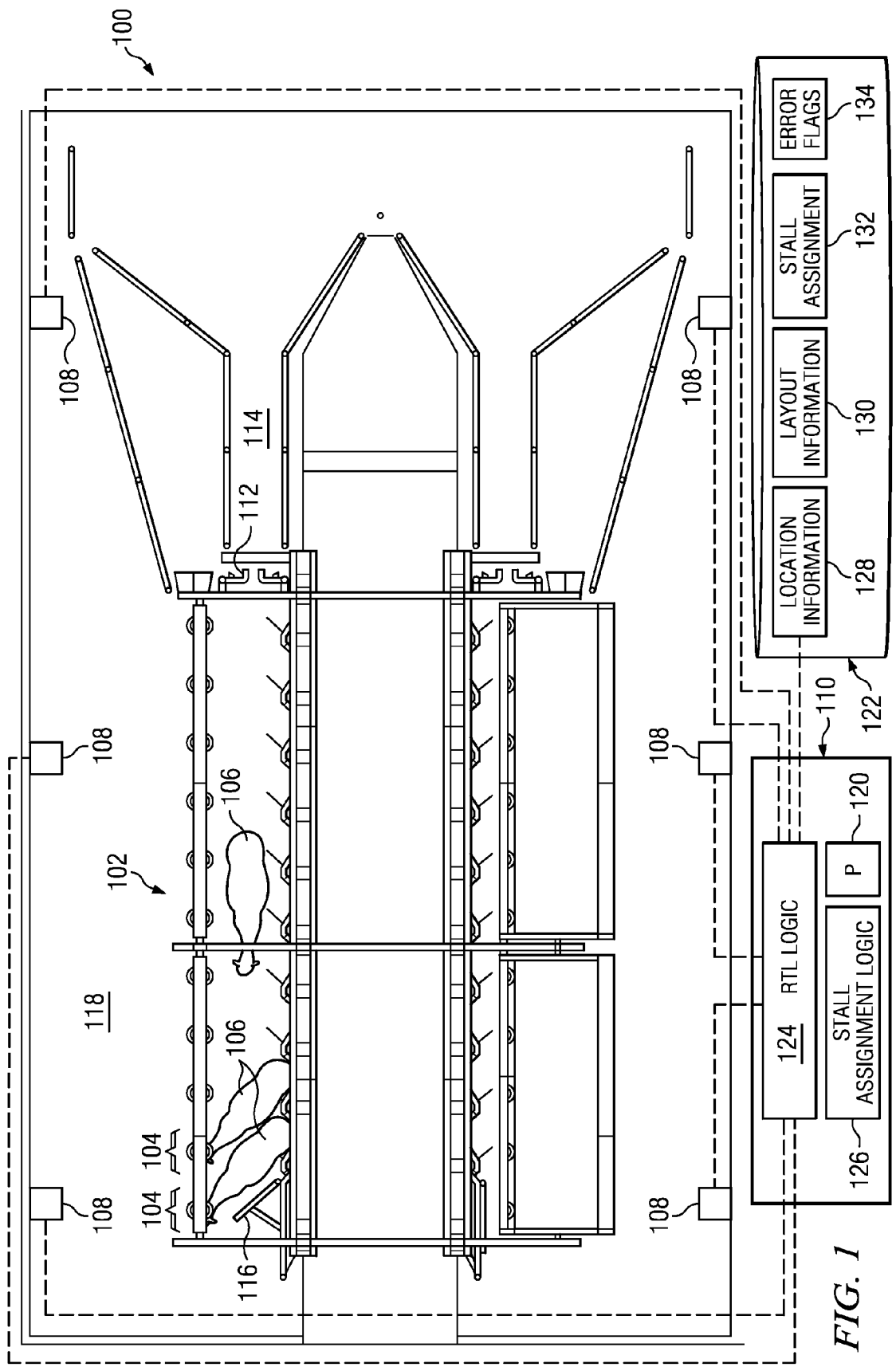
FIG. 1 illustrates a top view of an example system for milking stall assignment using real-time location, according to certain embodiments of the present disclosure.

FIG. 1 illustrates a top view of an example system 100 for milking stall assignment using real-time location, according to certain embodiments of the present disclosure. System 100 includes a milking parlor 102 having a number of milking stalls 104 each configured for milking one of a number of dairy livestock 106. System 100 further includes a number of identification devices 108 positioned in and/or around milking parlor 102, each of the identification devices 108 being configured to (1) read tags affixed to each of the dairy livestock 106 and/or tags affixed to other suitable components of system 100, and (2) communicate signals corresponding to those tags to a controller 110. Although this particular implementation of system 100 is illustrated and primarily described, the present invention contemplates any suitable implementation of system 100 according to particular needs. Additionally, although the present disclosure contemplates milking stalls 104 of milking parlor 102 being configured for milking any suitable dairy livestock 106 (e.g., cows, goats, sheep, water buffalo, etc.), the remainder of this description is detailed with respect to the milking of dairy cows 106.

Milking parlor 102 may include any suitable combination of structure and materials forming a number of milking stalls 104. As one particular example, milking parlor 102 may be a herringbone-style milking parlor having two rows of diagonally-oriented, outwardly-facing milking stalls 104. In certain embodiments, milking parlor 102 may include an entrance gate 112 configured to control the flow of dairy cows 106 into milking stalls 104 of milking parlor 102 from an entrance lane 114 positioned adjacent to milking parlor 102. Additionally, milking parlor 102 may include an exit gate 116 configured to control the flow of dairy cows 106 from milking stalls 104 of milking parlor 102 into an exit lane 118 positioned adjacent to milking parlor 102. Although milking parlor 102 is illustrated as being a herringbone-style milking parlor having a particular number of milking stalls 104, the present disclosure contemplates milking parlor 102 being any suitably-configured milking parlor, according to particular needs.

A number of identification devices 108 may be positioned at various locations within and/or adjacent to milking parlor 102. Although a particular number of identification devices 108 are illustrated as being positioned at particular locations within/adjacent to milking parlor 102, the present disclosure contemplates any suitable number of identification devices 108 located at any suitable positions within and/or adjacent to milking parlor 102, according to particular needs.

Identification devices 108 may each include any suitable device operable to receive a signal from a tag located in or near milking parlor 102. In response to a signal received from a tag located in or near milking parlor 102, identification devices 108 may generate a signal corresponding to that tag for communication to controller 110 (described below). Communication between identification devices 108 and tags may be facilitated by any suitable technology, including, for example, passive radio-frequency identification (RFID), active RFID, Wi-Fi, Bluetooth, ultra-wide band (UWB), Zig-Bee, acoustic locating, and computer vision.

In certain embodiments, identification devices 108 may be operable to generate signals corresponding to a tag affixed to a component of system 100 (e.g., entrance gate 112 and/or exit gate 116), the generated signals including (1) an identification of the component to which the tag is affixed (e.g., entrance gate 112 or exit gate 116), (2) the distance that the tag is located from the identification device 108 generating the signal, (3) an identification of the identification device

108 generating the signal, and/or (4) a timestamp. Based on these signals, controller 110 may be operable to determine a position for the component of system 100 to which the tag is affixed. For example, in embodiments in which tags are affixed to entrance gate 112 and exit gate 116, controller 110 may be operable to determine whether entrance gate 112 and exit gate 116 are in an open position or a closed position based on signals generated by identification devices 108 corresponding to tags affixed to entrance gate 112 and exit gate 116 (as described in further detail below).

In certain embodiments, identification devices 108 may be operable to generate signals corresponding to tags affixed to dairy cows 106 located in milking parlor 102 (e.g., neck tags, ear tags, or any other suitable tags), the generated signals including (1) an identification of the dairy cow 106, (2) the distance the dairy cow 106 is located from the identification device 108 generating the signal, (3) an identification of the identification device 108 generating the signal, and/or (4) a timestamp. Based on these signals, controller 110 may be operable to determine positions for dairy cows 106 within milking parlor 102 (as described in further detail below).

Identification devices 108 may each be communicatively coupled (e.g., via a network facilitating wireless or wireline communication) to controller 110. Controller 110 may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input devices and output devices may include fixed or removable storage media such as a magnetic computer disk, CD-ROM, or other suitable media to both receive input from and provide output to a user. Each computer system may include a personal computer, workstation, network computer, kiosk, wireless data port, personal data assistant (PDA), one or more processors within these or other devices, or any other suitable processing device. In short, controller 110 may include any suitable combination of software, firmware, and hardware.

Controller 110 may additionally include one or more processing modules 120 and one or more memory modules 122 (each referred to in the singular throughout the remainder of this description). Processing module 120 may include one or more microprocessors, controllers, or any other suitable computing devices or resources and may work, either alone or with other components of system 100, to provide a portion or all of the functionality of system 100 described herein. Memory module 122 may take the form of volatile or non-volatile memory including, without limitation, magnetic media, optical media, random access memory (RAM), read-only memory (ROM), removable media, or any other suitable memory component.

Controller 110 may additionally include real-time location (RTL) logic 124 and stall assignment logic 126 (e.g., each stored memory module 122). RTL logic 124 may include any information, logic, and/or instructions stored and/or executed by controller 110 to determine location information 128 associated with tags located within and/or adjacent to milking parlor 102 (e.g., tags affixed to components of system 100 and/or tags dairy cows 106) based on signals received from identification devices 108 (as described in further detail below). Stall assignment logic 126 may include any information, logic, and/or instructions stored and/or executed by controller 110 to determine, based on location information 128 associated with a tag affixed to a particular dairy cow 106 generated by RTL logic 124, an appropriate milking stall 104 to be assigned to the particular dairy cow 106 (as described in further detail below). Although certain functionality is described below as being associated with either real-time location RTL logic 124 or stall assignment logic 126, the present disclosure contemplates the functionality described below as being combined or divided among any suitable logic, according to particular needs.

Controller 110 may be operable to receive signals generated by identification devices 108. In certain embodiments, controller 110 may receive, from one or more identification devices 108, signals corresponding to tags affixed to certain components of system 100 (e.g., entrance gate 112 and/or exit gate 116). Furthermore, for a particular component to which a tag is affixed, controller 110 may receive signals from each identification device 108 at or about the same time and at regular intervals (e.g., every fifteen seconds). For example, in embodiments in which a tag is affixed to entrance gate 112, controller 110 may receive signals generated by a number of identification devices 108 at or about the same particular time, each signal identifying entrance gate 112 and the distance the tag affixed to entrance gate 112 is located from the corresponding identification device 108. Based on the received signals, controller 110 may determine location information 128 for entrance gate 112 at the particular time (e.g., using RTL logic 124, as described below).

In certain embodiments, controller 110 may additionally receive, from one or more identification devices 108, signals corresponding to tags affixed to dairy cows 106 located within and/or adjacent to milking parlor 102. Furthermore, for a particular dairy cow 106, controller 110 may receive signals from each identification device 108 at or about the same time and at regular intervals (e.g., every fifteen seconds). For example, for a particular dairy cow 106 at a particular time, controller 110 may receive signals generated by a number of identification devices 108 (e.g., each signal identifying the particular dairy cow 106 and the distance the particular dairy cow 106 is located from the corresponding identification device 108). Based on the received signals, controller 110 may determine location information 128 associated with the particular dairy cow 106 at the particular time (e.g., using RTL logic 124, as described below).

In certain embodiments, RTL logic 124 may be operable to process signals received from identification devices 108 in order to determine location information 128 associated with tags to which the received signals correspond (e.g., tags affixed to components of system 100 and/or dairy cows 106 located within and/or adjacent to milking parlor 102). As described above, a particular subset of the received signals may be generated by the identification devices 108 at approximately the same time and may correspond to the same particular tag. Each of the signals of the particular subset may additionally include a distance from the corresponding identification device 108 to the particular tag. Based on the subset of received signals, RTL logic 124 may determine a coordinate location (e.g., using triangulation) of the particular tag within and/or adjacent to milking parlor 102. In certain embodiments, the determined coordinate location may be an (X,Y) location. In certain other embodiments, the determined coordinate location may be an (X) location. The generated location information 128 associated with each dairy cow 106 may then be stored (e.g., in memory module 122 or any other suitable location in system 100) such that the location information 128 may be later accessed (e.g., by stall assignment logic 126, as described in further detail below).

In certain embodiments, stall assignment logic 126 may be operable to access location information 128 generated by RTL logic 124 (as described above) and make a determination regarding the position of the tag to which the location information 128 corresponds. More particularly, if the accessed location information 128 corresponds to a tag affixed to entrance gate 112, stall assignment logic 126 may be operable to determine whether entrance gate 112 is in an open or closed position. For example, stall assignment logic 126 may compare the accessed location information 128 with layout information 130 (e.g., stored in memory module 122), layout information 130 specifying a position for entrance gate 112 in each of an open position and a closed position. Based on that comparison, stall assignment logic 126 may determine whether entrance gate 112 is in an open position or a closed position at a given time. Stall assignment logic 126 may additionally be operable to make a similar open/closed determination regarding exit gate 116.

If the accessed location information 128 corresponds to a tag affixed to a particular dairy cow 106, stall assignment logic 126 may be operable to determine an appropriate milking stall 104 to be assigned to the particular dairy cow 106 at a given time (e.g., a time after dairy cows 106 have entered milking parlor 102 and stall assignment logic 126 has determined that both entrance gate 112 and exit gate 116 are in a closed position). For example, an appropriate milking stall 104 for the particular dairy cow 106 may be determined by comparing location information 128 associated with the particular dairy cow 106 (including a coordinate location for the particular dairy cow 106, as described above) with layout information 130 for milking parlor 102 (e.g., stored in memory module 122).

In embodiments in which the determined location information 128 includes an (X,Y) coordinate location for the particular dairy cow 106, layout information 130 for milking parlor 102 may include (X,Y) coordinate locations defining the corners of each of the milking stall 104 of milking parlor 102 (and thus defining the area within each milking stall 104). By comparing the (X,Y) coordinate locations for the particular dairy cow 106 with layout information 130 defining the area within each milking stall 104, stall assignment logic 126 may determine a milking stall 104 in which the particular dairy cow 106 is located a given time.

In embodiments in which the determined location information 128 includes an (X) coordinate location for the particular dairy cow 106, layout information 130 for milking parlor 102 may include (X) coordinate locations defining the position of each of the milking stall 104 of milking parlor 102 (e.g., milking parlor 102 may be a herringbone-style milking parlor oriented along the (X) axis such that an (X) coordinate location uniquely defines a milking stall 104). By comparing the (X) coordinate location for the particular dairy cow 106 with layout information 130 including (X) coordinate locations for each of the milking stall 104, stall assignment logic 126 may determine a milking stall 104 in which the particular dairy cow 106 is located a given time.

Alternatively, in embodiments in which the determined location information 128 includes an (X) coordinate location for the particular dairy cow 106, layout information 130 for milking parlor 102 may include the order in which milking stall 104 are arranged within milking parlor 102. By determining the position of the particular dairy cow 106 relative to other dairy cows 106 in milking parlor 102 (by comparing the (X) coordinate location of the particular dairy cow 106 with the (X) coordinate locations of other dairy cows 106), stall assignment logic 126 may determine a milking stall 104 in which the particular dairy cow 106 is located at a given time. Additionally, if stall assignment logic 126 determines that the distance between the (X) coordinate location of the particular dairy cow 106 and the (X) coordinate location of an adjacent dairy cow 106 is greater than a predefined distance (e.g., a distance corresponding to 1.5 times the width of a milking stall 104), stall assignment logic 126 may determine either that (1) an empty milking stall 104 is located between the particular dairy cow 106 and the adjacent dairy cow 106, or (2) an unknown dairy cow 106 is located in the milking stall 104 is located between the particular dairy cow 106 and the adjacent dairy cow 106.

Having determined the milking stall 104 in which the particular dairy cow 106 is located, stall assignment logic 126 may be further operable to "assign" that milking stall 104 to the particular dairy cow 106. For example, stall assignment logic 126 may store stall assignment information 132 (e.g., in memory module 122) associating the particular dairy cow 106 with the milking stall 104. Accordingly, stall assignment logic 126 may facilitate accurate assignment of the milking stalls 104 to dairy cows 106 such that milk produced may be associated with the appropriate dairy cow 106, thereby facilitating the tracking of milk output/quality for each of the dairy cows 106 in the herd.

In certain embodiments, stall assignment logic 126 may be further operable to access subsequent location information 128 for the particular dairy cow 106 (i.e., location information 128 generated after a milking stall 104 has been assigned to the particular dairy cow 106) and again determine a milking stall 104 in which the particular dairy cow 106 is located (as described above). If the milking stall 104 in which the dairy cow 106 is determine to be located based on the subsequent location information 128 differs from the milking stall 104 previously assigned to the particular dairy cow 106, stall assignment logic 126 may be further operable to store an error flag 134 noting the discrepancy.

Although a particular implementation of system 100 is illustrated and primarily described, the present disclosure contemplates any suitable implementation of system 100, according to particular needs.

Figure 2:
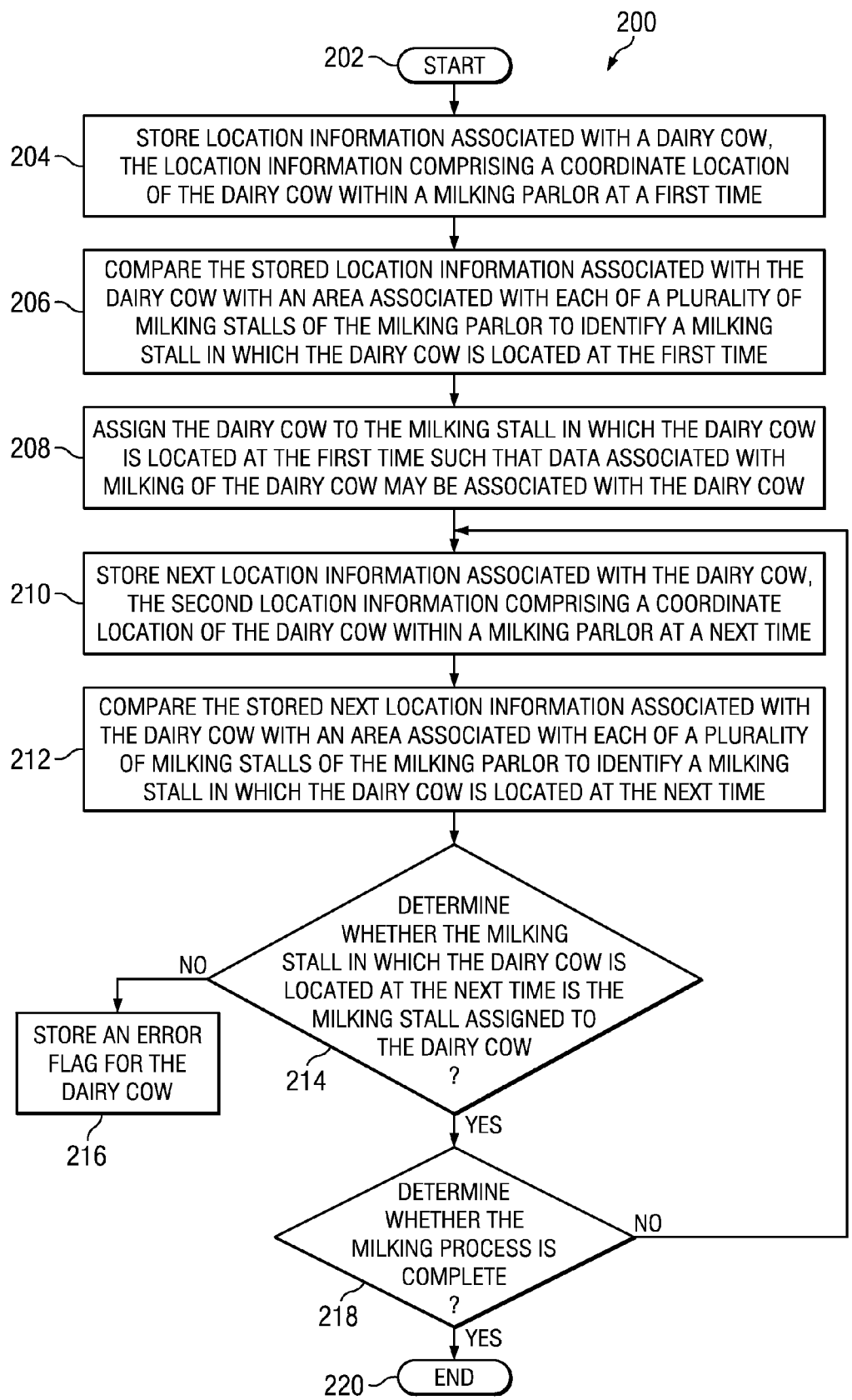
FIG. 2 illustrates an example method for milking stall assignment using real-time location, according to certain embodiments of the present disclosure.

FIG. 2 illustrates an example method 200 for milking stall assignment using real-time location, according to certain embodiments of the present disclosure. The method begins at step 202. At step 204, controller 110 may store location information 128 associated with a dairy cow 106. The stored location information 128 may be determined by RTL logic 124 (as described above with regard to FIG. 1) and may include a coordinate location of the dairy cow 106 within a milking parlor 102 at a first time. At step 206, controller 110 may compare the stored location information 128 associated with the dairy cow 106 with an area associated with each of a plurality of milking stalls 104 of the milking parlor 102 (e.g., by accessing stored layout information 130). Based on that comparison, controller 110 may identify a milking stall 104 in which the dairy cow 106 is located at the first time.

For example, in embodiments in which location information 128 includes an (X,Y) coordinate location for the dairy cow 106, controller 110 may compare location information 128 with accessed layout information 130 that includes (X,Y) coordinate locations defining the corners of each of the milking stall 104 (and thus defining the area within each milking stall 104) to determine the milking stall 104 in which the dairy cow 106 is located. As another example, in embodiments in which the location information 128 includes an (X) coordinate location for the dairy cow 106, controller 110 may compare location information 128 with accessed layout information 130 that includes (X) coordinate locations defining the position of each of the milking stall 104 of milking parlor 102 (e.g., milking parlor 102 may be a herringbone-style milking parlor oriented along the (X) axis such that an (X) coordinate location uniquely defines a milking stall 104) to determine the milking stall 104 in which the dairy cow 106 is located.

At step 208, controller 110 may assign the dairy cow 106 to the milking stall 104 in which the dairy cow 106 is determined to be located at the first time (e.g., by storing stall assignment information 132 in memory module 122). As a result, data associated with the milking of the dairy cow 106 may be associated with the dairy cow 106.

At step 210, controller 110 may store next location information 128 associated with the dairy cow 106. The second location information 128 may include a coordinate location of the dairy cow 106 within a milking parlor at a next time. For example, RTL logic 124 may generate location information 128 associated with the dairy cow 106 at regular time intervals (e.g., every fifteen second), and the next location information 128 may be the next generated location information 128. At step 212, controller 110 may compare the stored next location information 128 associated with the dairy cow 106 with an area associated with each of a plurality of milking stalls 104 of the milking parlor 102 (e.g., by accessing stored layout information 130 in a substantially similar manner to that described above). Based on that comparison, controller 110 may identify a milking stall 104 in which the dairy cow 106 is located at the next time.

At step 214, controller 110 may determine whether the milking stall 104 in which the dairy cow 106 is located at the next time is the milking stall 104 previously assigned to the dairy cow 106. If the milking stall 104 in which the dairy cow 106 is located at the next time is not the milking stall 104 previously assigned to the dairy cow 106, an error flag 134 may be stored for the dairy cow 106 at step 216. The error flag 134 may note the discrepancy in determined milking stalls 104 such that a dairy farmer may resolve the conflict. If the milking stall 104 in which the dairy cow 106 is located at the next time is the milking stall 104 previously assigned to the dairy cow 106, the method proceeds to step 218.

At step 218, controller 110 may determine if the milking process is complete. If controller 110 determines that the milking process is not complete, the method returns to step 210 and the method proceeds as described above. If controller 110 determines that the milking process is complete, the method ends at step 220. Although the steps of method 200 have been described as being performed in a particular order, the present disclosure contemplates that the steps of method 200 may be performed in any suitable order, according to particular needs.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for milking stall assignment, comprising:
storing first location information associated with a dairy livestock, the first location information comprising a coordinate location of the dairy livestock within a milking parlor at a first time;
storing layout information associated with the milking parlor, the layout information comprising one or more coordinate locations defining an area associated with each of a plurality of milking stalls in the milking parlor;
comparing the stored first location information associated with the dairy livestock with the one or more coordinate locations defining the area associated with each of the plurality of milking stalls of the milking parlor to identify a milking stall in which the dairy livestock is located at the first time;
assigning the dairy livestock to the milking stall in which the dairy livestock is located at the first time such that data associated with milking of the dairy livestock may be associated with the dairy livestock;
storing second location information associated with the dairy livestock, the second location information comprising a coordinate location of the dairy livestock within a milking parlor at a second time;
comparing the stored second location information associated with the dairy livestock with an area associated with each of a plurality of milking stalls of the milking parlor to identify a milking stall in which the dairy livestock is located at the second time;
determining whether the milking stall in which the dairy livestock is located at the second time is the milking stall assigned to the dairy livestock;
if the milking stall in which the dairy livestock is located at the second time is the milking stall assigned to the dairy livestock, determining whether a milking process for the dairy livestock is complete; and
if the milking stall in which the dairy livestock is located at the second time is not the milking stall assigned to the dairy livestock, storing an error flag associated with the dairy livestock.

2. The method of claim 1, wherein the first location information is generated by a real-time location system (RTLS) comprising a plurality of identification devices, the plurality of identification devices each operable to generate a signal corresponding to a tag affixed to the dairy livestock.

3. The method of claim 2, wherein communication between the plurality of identification devices and the tag affixed to the dairy livestock is facilitated by ultra-wide band (UWB) technology.

4. The method of claim 2, wherein the RTLS is operable to determine the location of the dairy livestock within the milking parlor at the first time by triangulating the signals generated by each of the plurality of identification devices at the first time.

5. The method of claim 1, wherein the coordinate location of the dairy livestock comprises an (X,Y) location of the dairy livestock at the first time.

6. The method of claim 1, wherein the coordinate location comprises an (X) location of the dairy livestock at the first time.

7. The method of claim 6, wherein the milking parlor is a herringbone milking parlor aligned lengthwise along the X-axis.

8. The method of claim 1, further comprising:
storing entrance gate location information comprising a coordinate location of an entrance gate of the milking parlor;
storing exit gate location information comprising a coordinate location of an exit gate of the milking parlor;
comparing the entrance gate location information with a known closed position to determine whether the entrance gate is closed; and
comparing the exit gate location information with a known closed position to determine whether the exit gate is closed.

9. A method for milking stall assignment, comprising:
storing entrance gate location information comprising a coordinate location of an entrance gate of the milking parlor;
storing exit gate location information comprising a coordinate location of an exit gate of the milking parlor;

comparing the entrance gate location information with a known closed position to determine whether the entrance gate is closed;
comparing the exit gate location information with a known closed position to determine whether the exit gate is closed;
storing layout information associated with the milking parlor, the layout information comprising one or more coordinate locations defining an area associated with each of a plurality of milking stalls in the milking parlor;
in response to determining that the entrance gate and the exit gate are each closed, performing the following:
  storing first location information associated with a dairy livestock, the first location information comprising a coordinate location of the dairy livestock within a milking parlor at a first time;
  comparing the stored first location information associated with the dairy livestock with the one or more coordinate locations defining the area associated with each of the plurality of milking stalls of the milking parlor to identify a milking stall in which the dairy livestock is located at the first time;
  assigning the dairy livestock to the milking stall in which the dairy livestock is located at the first time such that data associated with milking of the dairy livestock may be associated with the dairy livestock;
  storing second location information associated with the dairy livestock, the second location information comprising a coordinate location of the dairy livestock within a milking parlor at a second time;
  comparing the stored second location information associated with the dairy livestock with an area associated with each of a plurality of milking stalls of the milking parlor to identify a milking stall in which the dairy livestock is located at the second time;
  determining whether the milking stall in which the dairy livestock is located at the second time is the milking stall assigned to the dairy livestock
  if the milking stall in which the dairy livestock is located at the second time is the milking stall assigned to the dairy livestock, determine whether a milking process for the dairy livestock is complete; and
  if the milking stall in which the dairy livestock is located at the second time is not the milking stall assigned to the dairy livestock, store an error flag associated with the dairy livestock.

\* \* \* \* \*